United States Patent [19]
Arai et al.

[11] Patent Number: 5,568,217
[45] Date of Patent: Oct. 22, 1996

[54] BACK COVER LOCK MECHANISM OF A CAMERA

[75] Inventors: Akihiro Arai; Yoshinori Ono, both of Tokyo, Japan

[73] Assignee: Asahi Kogaku Kogyo Kabushiki Kaisha, Tokyo, Japan

[21] Appl. No.: 577,544

[22] Filed: Dec. 22, 1995

[30] Foreign Application Priority Data

Dec. 28, 1994 [JP] Japan .................................. 6-328787

[51] Int. Cl.⁶ .................................................. G03B 17/02
[52] U.S. Cl. .................................. 396/536; 292/DIG. 48; 396/535
[58] Field of Search .......................... 354/82, 288, 275; 352/72, 78 R, 242; 292/DIG. 48

[56] References Cited

U.S. PATENT DOCUMENTS

| | | | |
|---|---|---|---|
| 3,096,699 | 7/1963 | Harvey et al. | 354/288 |
| 3,259,410 | 7/1966 | Neudecker et al. | 352/242 |
| 3,943,537 | 3/1976 | Lange | 354/288 |
| 4,306,795 | 12/1981 | Lamoine | 354/288 |
| 4,501,479 | 2/1985 | Lamoine | 354/275 |
| 4,887,114 | 12/1989 | Yamamoto et al. | |
| 5,115,264 | 5/1992 | Schappler | 354/82 |
| 5,193,707 | 3/1993 | Mizumura | |
| 5,347,335 | 9/1994 | Misawa | |

*Primary Examiner*—A. A. Mathews
*Attorney, Agent, or Firm*—Greenblum & Bernstein P.L.C.

[57] ABSTRACT

A back cover lock mechanism of a camera. The camera has a camera body that includes side walls, a front surface arranged to incorporate a photographing lens, and a back cover that is pivoted to the camera body. The back cover lock mechanism has a first hook member provided at a predetermined portion of the back cover, and a second hook member provided inside one of the walls of the camera body. The second hook member is arranged to detachably engage the first hook member. A covering member for movably supporting the second hook member is provided inside one of the side walls of the camera body. A supporting member supports the covering member, the supporting member being provided inside one of the side walls of the camera body so that the second hook member is placed between the covering member and one of the side walls, whereby the second hook member is movable between a locked position and an unlocked position.

28 Claims, 2 Drawing Sheets

BACK COVER LOCK MECHANISM OF A CAMERA

BACKGROUND OF THE INVENTION

1. Field of The Invention

The present invention relates to a lock mechanism provided on a back cover of a camera. In particular, the present invention provides a sturdy supporting structure for a lock mechanism of a camera without making a camera contour complicated.

2. Description of Related Art

In a camera, a camera body includes side walls and a front surface, which can be considered a main casing of a camera. A back cover, also included in the camera body, is attached to the main casing with a predetermined installing mechanism so that the back cover can be opened/closed. The main casing and the back cover constitute an overall camera contour. More concretely, one side of the back cover is pivoted at the camera body so that the back cover is swingably moved for the purpose of opening/closing the back cover and providing access to a film loading compartment in the camera. Usually, the non-pivoted end (free end) of the back cover is provided with a first hook, and a corresponding second hook to engage the first hook is provided on one of the side walls of the camera body. The first hook and the second hook, considered to be a part of a back cover lock mechanism, are arranged to engage when the back cover is closed. In a conventional back cover lock mechanism, the second hook including a predetermined shape is contained in a supporting portion, which is formed outside the camera body by forming a stepped portion, indenting from the contour of the camera body. The second hook is usually covered by a covering member which is designed to be a part of the camera contour. Accordingly, when the covering member is removed, the second hook is visible from outside.

In the camera having the conventional back cover lock mechanism stated above, the camera body including the side walls, the front surface, and the second hook have been made of synthetic resin. The structure of the camera made of synthetic resin has caused a drawback in that the synthetic resin material can not properly follow a mold of the camera contour because the shape of the main casing is complicated due to the supporting portion for the second hook. Inevitably, forming defects have often been observed in products, and the strength of the supporting portion of the second hook has duly become weaker.

SUMMARY OF THE INVENTION

A main objective of the present invention is to provide a back cover lock mechanism, while attaining a simple contour of the camera and sufficient strength for the supporting portion for the second hook.

To achieve this objective, according to the present invention, there is provided a back cover lock mechanism of a camera, the camera comprising a camera body including side walls and a front surface arranged to incorporate a photographing lens, and a back cover that is pivoted to the camera body; the back cover lock mechanism comprising a first hook member provided at a predetermined portion of the back cover; a second hook member provided inside one of the side walls of the camera body, the second hook member being arranged to detachably engage the first hook member; a covering member for movably supporting the second hook member, the covering member being provided inside one of the side walls of the camera body; and a supporting member for supporting the covering member, the supporting member being provided inside one of the side walls of the camera body so that the second hook member is placed between the covering member and one of the side walls, whereby the second hook member is movable between a locked position and an unlocked position.

The present disclosure relates to the subject matter contained in the Japanese Patent Application No. 6-328787 (filed on Dec. 28, 1994), which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
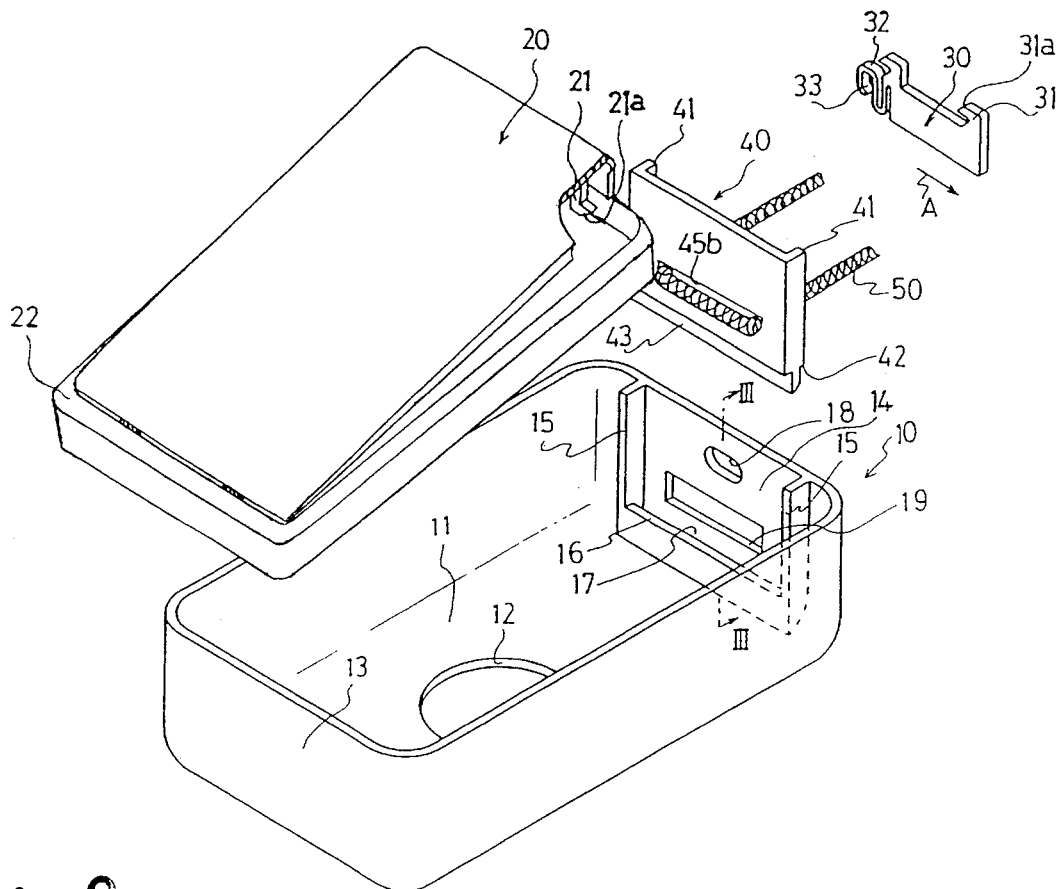
FIG. 1 is an exploded view of a back cover lock mechanism to which the present invention is applied.

FIG. 1 illustrates a camera body that includes a main casing 10, a back cover 20, and a back cover supporting frame 22. This drawing is so illustrated such that the inside of the main casing 10 may be observed. The main casing 10 includes side walls 13 and 14, and a front wall 11. On a front wall 11 of the main casing 10, there is provided an opening 12 for setting and incorporating a photographing lens (not shown). The back cover supporting frame 22 is attached to the side walls 13 and 14 of the camera body. The back cover 20 is pivoted at one end of an opening formed in the back cover supporting frame 22. On a predetermined portion of the back cover 20, there is provided an approximately L-shaped first hook 21, which has a tapered guide surface 21a.

The structure of the camera body is not limited to that shown in FIG. 1. Alternatively, the back cover supporting frame 22 may be eliminated and the back cover 20 may be made larger in size and directly pivoted to one of the side walls 13 and 14.

On the inside of the side wall 14, a second hook 30 is provided for holding and releasing the first hook 21 provided on the back cover 20. As will be explained, one of the main features of the present invention is related to a supporting mechanism for the second hook 30. The first hook 21 and the second hook 30 are arranged to work as part of a back cover lock mechanism for the purpose of opening and closing the back cover 20. Also, on the inside of the side wall 14, a pair of guiding members 15, 15 is provided in a direction parallel with an optical axis of the photographing lens to be inserted in the opening 12. The guiding members 15, 15 have a predetermined length along the optical axis of the photographing lens, and at the end of the length, which is closest to the lens opening 12, there is provided a stopper 16 integrally connecting both ends of the guiding members 15, 15. Moreover, the stopper 16 and the inner surface of the side wall 14 form a groove 17.

On the other hand, for the purpose of supporting the second hook 30, there is provided a second hook covering member 40 to contain the second hook 30 between the side wall 14 and an inner wall of the second hook covering member 40. As illustrated in FIG. 1, the covering member 40 may be substantially rectangle, and comprises first following members 41, 41 which correspond to the guiding members 15, 15, and a second following member 43 which corresponds to the groove 17. The second hook covering member 40 is inserted into the area defined by the guiding members 15, 15 and the stopper 16, with the second following member 43 being inserted into the groove 17. In addition, on the inner wall of the covering member 40 which faces the second hook 30, a projection 44, to which the second hook 30 is to be movably secured, is formed.

In this embodiment, the covering member 40 is substantially rectangle, but the shape of the covering member 40 is not limited to this type. As long as the covering member 40 fulfills the purpose of supporting the second hook 30, any shape of the covering member will be possible for the present invention.

Figure 2:
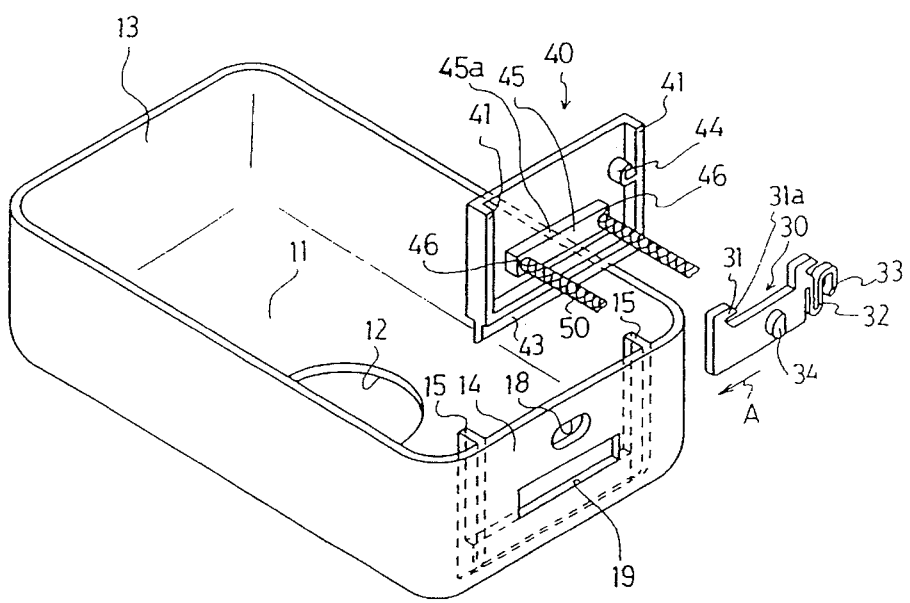
FIG. 2 is an exploded view of a back cover lock mechanism viewed from another direction.

The details on the second hook 30 will now be explained. The second hook 30 comprises a plate member formed in a predetermined shape having a predetermined thickness, as illustrated in FIG. 2. The second hook 30 includes an engaging portion 31 on one end thereof to engage the first hook 21 provided on the back cover 20, and a spring portion 32 formed on another end of the second hook. The spring portion 32 has a serpentine shape, so that the spring portion 32 can be elastically deformable according to a force applied thereto. At the free end of the spring portion 32, a hook member 33 is formed so that the projection 44 can engage the hook member 33. The engaging portion 31 is formed to protrude toward the spring portion 32, and an upper surface of the engaging portion 31 is slanted by a predetermined angle toward the center of the second hook 30. The slanted surface is arranged to serve as a guide surface 31a so that the tapered guide surface 21a of the first hook 21 comes slidingly in contact with the guide surface 31a. The second hook 30 is also provided with an operating projection 34 for moving the second hook 30 to an unlocked position (in the direction of "A" in FIG. 2). The operating projection 34 is formed so as to protrude from the main casing 10 through an opening 18 formed in the main casing 10. Accordingly, the operating projection 34 is manually operable from the outside of the main casing of the camera.

The shape of the second hook 30 is not limited to the one explained in this embodiment. As long as the second hook 30 is designed to engage the first hook 21 and is suitably supported between the covering member 40 and the side wall 14, any shape of the second hook is possible.

Figure 3:
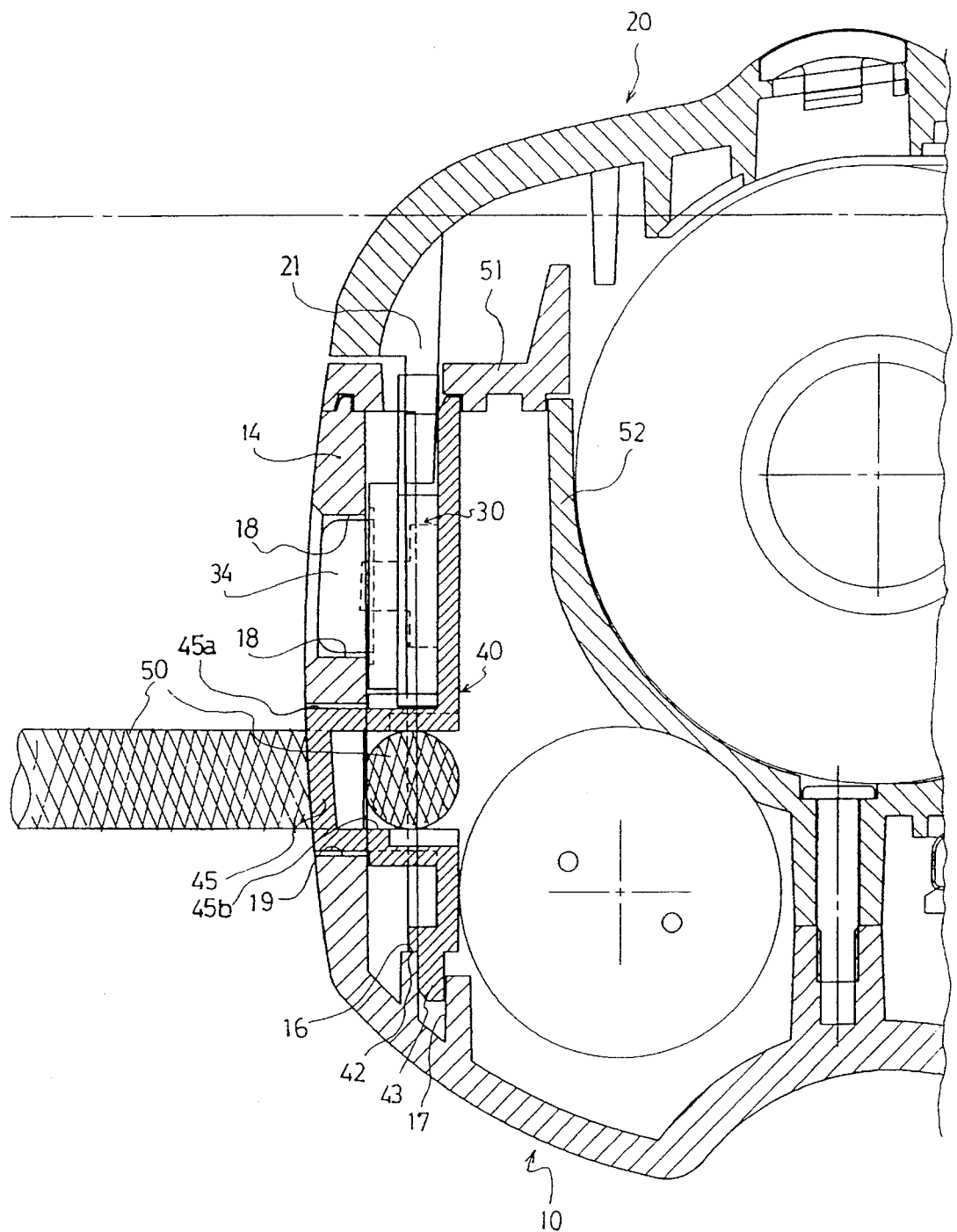
FIG. 3 is a cross-sectional view seen from the section III—III in FIG. 1.

The second hook covering member 40 may further include a strap receiving portion 45, which is integrally formed with the second hook covering member 40. As shown in FIGS. 2 and 3, the strap receiving portion 45, seen from outside of the camera body, is a protrusion 45a. On the other hand, seen from the inside of the camera body, the strap receiving portion 45 is a straight groove 45b. The groove 45b is so formed as to receive a strap 50. At both ends of the groove 45b (i.e., the protrusion 45a), through holes 46, 46 are formed on the second hook covering member 40, so that the strap 50 is led outside the main casing 10. Furthermore, on the main casing 10, an opening 19 is formed, which has a shape corresponding to the protrusion 45a so that the surface of the protrusion 45a is flush with the outer surface of the side wall 14. When the second hook covering member 40 is inserted in the guiding members 15, 15, the protrusion 45a is then fixed into the opening 19, so that the strap 50 is taken from the opening 19 to outside.

As shown in FIG. 13, an upper surface of the protrusion 45b is arranged to support the second hook 30 so that the second hook 30 is smoothly movable in direction "A" when the operating projection 34 is operated. Furthermore, according to this supporting structure for the second hook 30, the second hook 30 is securely supported along the entire moving path, so that an accidental rotation of the second hook around the projection 44 is prevented.

As the structural elements of the back cover lock mechanism are already explained, a process of assembling of these elements will be explained. The second hook covering member 40 is first taken up. Then, the strap 50 is inserted in the groove 45b of the strap receiving portion 45, and is pulled from the through holes 46, 46. After the strap 50 is installed, the hook member 33 of the second hook 30 is set on the projection 44 of the second hook covering member 40. After the strap 50 is completely pulled out from the opening 19 formed on the main casing 10, the second hook covering member 40 is inserted between the pair of guiding members 15, 15. More concretely, the first following members 41, 41 of the second hook covering member 40 are guided by the guiding members 15, 15 when the second hook covering member 40 is inserted in the predetermined area constituted by the guiding members 15, 15 and the stopper 16. Through the assembly process mentioned above, the second following member 43 is fixed in the groove 17, the protrusion 45 is fixed in the opening 19 so that the outer surface of the protrusion 45 is made flush with the surface of the main casing 10, and the operating projection 34 is movably inserted in the opening 18. Furthermore, with adhesive or screws, the second hook covering member 40 may be fixed on the side wall 14, and an end cover 51 (see FIG. 3) is attached to an upper end of the second hook covering member 40.

According to FIGS. 1 and 2, the upper end of the second hook covering member 40 is the edge opposing the following member 43. As FIG. 3 shows, the end cover 51 is arranged to bridge the second hook covering member 40 and an immovable member 52 in the main body. Through the above assembly process, the second hook 30, the second hook covering member 40 and the strap 50 are installed on the side wall 14 of the main body 10.

Under the assembled condition, due to the spring force of the spring portion 31, the engaging portion 31 of the second hook 30 is arranged to maintain a position where the first hook 21 formed on the back cover 20 can engage the engaging portion 31. When the back cover 20 is being closed, the tapered guide surface 21a of the first hook 21 comes into contact with the a guide surface 31a, so that the second hook 30 is forcibly moved to the unlocking direction "A" (FIG. 2), opposing the spring force of the spring portion 32. When the first hook 21 goes beyond the engaging portion 31, the second hook 30 returns to the original position by the spring force by the spring portion 32. The first hook 21 and the engaging portion 31 are then in the engaging condition, so that the back cover 20 is locked. On the other hand, when the back cover 20 is opened, the operating projection 34 is manually moved, opposing the spring force of the spring portion 32, in the unlocking direction "A". According to this operation, the first hook 21 and the engaging portion 31 of the second hook 30 are disengaged, and the back cover 20 may be opened.

As explained, according to the back cover lock mechanism of the present invention, with the second hook covering member 40 provided on the inner side of the side wall 14 of the main casing 10, an appearance of the main body can be simplified. Furthermore, with the second hook 30 and the second hook covering member 40 being both provided in the camera body, the strength of the main body can be increased, because, unlike conventional designs, the present invention does not require a complicated contour for the camera. In other words, a complicated molding for the main body is unnecessary. In addition, the second hook covering member 40 is securely pressed against the inside wall 14 when the camera is hung by the strap 50 because the strap 50 is set in the groove 45b formed on the second hook covering member 40 and arranged to come out from the camera body.

What is claimed is:

1. A back cover lock mechanism of a camera having a camera body that includes side walls, a front surface that is arranged to incorporate a photographing lens, and a back cover that is pivoted to said camera body, said back cover lock mechanism comprising:

a first hook member provided at a predetermined portion of said back cover;

a second hook member provided inside one of said side walls of said camera body, said second hook member being arranged to detachably engage said first hook member;

a covering member for movably supporting said second hook member, said covering member being provided inside one of said side walls of said camera body; and a supporting member for supporting said covering member, said supporting member being provided inside said one of said side walls of said camera body so that said second hook member is placed between said covering member and one of said side walls, whereby said second hook member is movable between a locked position and an unlocked position.

2. The back cover lock mechanism according to claim 1, wherein said supporting member comprises a pair of guiding members for receiving said covering member.

3. The back cover lock mechanism according to claim 2, wherein said guiding members comprise elongated bars, said elongated bars being parallel with an optical axis of said photographing lens.

4. The back cover lock mechanism according to claim 3, wherein said supporting member further comprises a transverse bar that connects adjacent ends of said elongated bars that are closest to said front surface of said camera body, said transverse bar and an inner side of said one of side walls of said camera body forming a groove for receiving a part of said covering member.

5. The back cover lock mechanism according to claim 4, wherein said elongated bars and said transverse bar are integrally formed with said one of said walls of said camera body.

6. The back cover lock mechanism according to claim 5, wherein said second hook member comprises an elastic deformable member, that is movably supported between said inner side of said one of said side walls of said camera body and said covering member.

7. The back cover lock mechanism according to claim 6, wherein a part of said second hook member is formed as a spring portion to make said second hook member elastically deformable.

8. The back cover lock mechanism according to claim 7, wherein an end of said spring portion is attached to said covering member so that said second hook member is movable between said locked position when said first hook member and said second hook member are engaged with one another, and said unlocked position where said second hook member and said first hook member are detached from one another.

9. The back cover lock mechanism according to claim 8, wherein said spring portion is formed in a serpentine shape and said end of said spring portion is hooked on a protrusion formed on said covering member.

10. The back cover lock mechanism according to claim 1, wherein said covering member is provided with means for supporting a strap for carrying said camera.

11. The back cover lock mechanism according to claim 10, wherein said strap supporting means is arranged to support said second hook member.

12. The back cover lock mechanism according to claim 11, wherein said strap supporting means includes a groove and holes formed on said covering member, said groove being formed on one side of said covering member as a protrusion on the other side of said covering member, wherein said strap is inserted into said groove and led outside of said camera body through said holes, said second hook member being movably supported on said protrusion.

13. The back cover lock mechanism according to claim 12, wherein said groove is arranged to face toward an inner side of said camera body, said protrusion being arranged to face toward an outside of said camera body.

14. The back cover lock mechanism according to claim 1, wherein said camera body includes a back cover supporting frame that is attached to said side walls, said back cover being pivoted at said back cover supporting frame.

15. A camera, comprising:

a camera body having side walls, and a front surface having an opening for incorporating a photographing lens;

a back cover that is pivoted to said camera body, said side walls, said front surface and said back cover forming a substantial part of an overall contour of said camera; and a back cover lock mechanism, comprising:

a first hook member attached to a predetermined portion of said back cover;

a second hook member that detachably engages said first hook member;

a covering member that covers and supports said second hook member, such that said second hook member is movable in said covering member to selectively lock and unlock said back cover; and a supporting member that supports said covering member;

said second hook member, said covering member, and said supporting member being provided inside one of said side walls of said camera body and accommodated within said overall contour of said camera.

16. The camera according to claim 15, wherein said supporting member comprises a pair of guiding members for receiving said covering member.

17. The camera according to claim 16, wherein said guiding members comprise elongated bars, said elongated bars being parallel with an optical axis of said photographing lens.

18. The camera according to claim 17, wherein said supporting member further comprises a transverse bar that connects adjacent ends of said elongated bars that are closest to said front surface of said camera body, said transverse bar and one of said side walls of said camera body forming a groove for receiving a part of said covering member.

19. The camera according to claim 18, wherein said elongated bars and said transverse bar are integrally formed with an inner surface of said one of said side walls of said camera body.

20. The camera according to claim 15, wherein said second hook member comprises an elastic deformable member that is movably supported between said covering member and one of said side wall of said camera body.

21. The camera according to claim 20, wherein a part of said second hook member is formed as a spring portion to make said second hook member elastically deformable.

22. The camera according to claim 21, wherein an end of said spring portion is attached to said covering member so that said second hook member is movably secured between said locked position with said first hook member and said unlocked position where said second hook member and said first hook member are detached from one another.

23. The camera according to claim 22, wherein said spring portion is formed in a serpentine shape and said end of said spring portion is hooked on a protrusion included in said covering member.

24. The camera according to claim 23, wherein said covering member is provided with means for supporting a strap for carrying said camera.

25. The camera according to claim 24, wherein said strap supporting means is arranged to support said second hook member.

26. The camera according to claim 25, wherein said strap supporting means includes a groove and holes formed on said covering member, said groove being formed on one side of said covering member as a protrusion on the other side of said covering member, wherein said strap is inserted into said groove and led outside of said camera body through said holes, said second hook member being movably supported on said protrusion.

27. The camera according to claim 26, wherein said groove is arranged to face toward an inner side of said camera body, said protrusion being arranged to face toward an outside of said camera body.

28. The camera according to claim 15, wherein said camera body includes a back cover supporting frame that is attached to said side walls, said back cover being pivoted at said back cover supporting frame.

* * * * *